(12) United States Patent
Whitehurst et al.

(10) Patent No.: US 9,896,936 B2
(45) Date of Patent: Feb. 20, 2018

(54) SPINNER FOR ELECTRICALLY GROUNDING FAN BLADES

(71) Applicant: UNITED TECHNOLOGIES CORPORATION, Farmington, CT (US)

(72) Inventors: Sean A. Whitehurst, South Windsor, CT (US); Patrick James McComb, Naugatuck, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 676 days.

(21) Appl. No.: 14/515,243

(22) Filed: Oct. 15, 2014

(65) Prior Publication Data

US 2015/0300176 A1     Oct. 22, 2015

Related U.S. Application Data

(60) Provisional application No. 61/936,943, filed on Feb. 7, 2014.

(51) Int. Cl.
*F01D 5/02*     (2006.01)
*F01D 5/14*     (2006.01)
(Continued)

(52) U.S. Cl.
CPC .............. *F01D 5/02* (2013.01); *F01D 5/147* (2013.01); *F01D 5/282* (2013.01); *F01D 5/286* (2013.01);
(Continued)

(58) Field of Classification Search
CPC .......... F01D 5/143; F01D 5/282; F01D 5/286; F01D 25/243; F02C 7/04; F02K 3/06
See application file for complete search history.

(56) References Cited

U.S. PATENT DOCUMENTS 2,401,247 A    5/1946    Hunter
3,703,341 A    11/1972    Garofalo
(Continued)

FOREIGN PATENT DOCUMENTS

EP    0 393 283     11/1989
EP    1 016 588 A2    5/2000
(Continued)

OTHER PUBLICATIONS

European Search Report for related European Application No. EP15153828; report dated Jun. 17, 2015.

*Primary Examiner* — Justin Seabe
(74) *Attorney, Agent, or Firm* — Cantor Colburn LLP

(57) ABSTRACT

A fan assembly for gas assembly engine is disclosed. The fan assembly includes a rotor that is coupled to at least one fan blade. The fan assembly also includes a spinner that extends towards the rotor and the fan blades so that an edge of the spinner engages the fan blades. The edge of the spinner thereby serves as a grounding element for the fan blade. If the spinner is fabricated from a composite or a plastic material that is not sufficiently conductive for grounding purposes, the edge may be coated with a conductive material. Alternatively, the spinner may be fabricated from a metallic material, which would eliminate the need for a conductive coating on the edge that engages the fan blades.

19 Claims, 2 Drawing Sheets

(51) Int. Cl.
  *F01D 5/28* (2006.01)
  *F01D 5/30* (2006.01)
  *F02K 3/06* (2006.01)
  *F01D 25/00* (2006.01)

(52) U.S. Cl.
  CPC .............. *F01D 5/30* (2013.01); *F01D 25/005* (2013.01); *F02K 3/06* (2013.01); F05D 2220/32 (2013.01); F05D 2230/30 (2013.01); F05D 2240/24 (2013.01); Y02T 50/672 (2013.01)

(56) References Cited

U.S. PATENT DOCUMENTS

| | | | |
|---|---|---|---|
| 3,834,157 A | 9/1974 | Hoffmann | |
| 5,102,302 A | 4/1992 | Schilling et al. | |
| 8,851,855 B2 * | 10/2014 | James | F01D 5/282 |
| | | | 416/224 |
| 2011/0236217 A1 | 9/2011 | Bottome | |
| 2013/0156588 A1 | 6/2013 | Murdock et al. | |
| 2013/0195633 A1 | 8/2013 | Hildebrand et al. | |

FOREIGN PATENT DOCUMENTS

| | | |
|---|---|---|
| EP | 2604794 A1 | 6/2013 |
| GB | 2432635 A | 5/2007 |

\* cited by examiner

SPINNER FOR ELECTRICALLY GROUNDING FAN BLADES

CROSS-REFERENCE TO RELATED APPLICATION

This application is a non-provisional patent application claiming priority under 35 USC § 119(e) to U.S. Provisional Patent Application Ser. No. 61/936,943 filed on Feb. 7, 2014.

BACKGROUND

Technical Field

This disclosure relates to fan blade assemblies for gas turbine engines. More specifically, this disclosure relates to the use of a spinner, or one or more components of the nose cone assembly, for electrically grounding fan blades, which have the potential to build up a static electric charge.

Description of the Related Art

Gas turbine engines are known, and typically include a fan delivering air to a compressor section. In the compressor section, the air is compressed and then delivered to a combustion section. The compressed air is mixed with fuel and burned in the combustion section. Products of this combustion pass downstream to drive a turbine section, which in turn drives the compressor section.

The fan blades are subject to a large volume of air moving across an airfoil, which can result in a significant build-up of static electric charge. Conventionally, the fan blades are formed of a conductive metal, such as aluminum or titanium that is grounded to the metallic rotor or hub to which the fan blades are mounted. As the grounding is provided by the metallic rotor, the static electrical charge dissipates. However, aluminum fan blades may be covered with a polyurethane coating and/or fabric wear pads to protect the aluminum from erosion. These materials have insulation qualities, which interfere with the grounding of the fan blades to the rotor. As a result, static charges can build up on coated aluminum fan blades, thereby leading to galvanic corrosion.

Recently, fan blades have become larger. One factor driving the larger fan blades is the use of a gear reduction between a turbine driven spool, which drives the fan blades and the low-pressure compressor. The gear reduction allows a single turbine to drive both the low compressor and the fan, but at different speeds.

As the size of fan blades has increased, their weight has also increased, which adversely effects fuel efficiency. As a result, fan blade designs are being modified to reduce the weight of the fan blades. One such modification is to change the material used to fabricate the fan blades from titanium alloys and aluminum alloys to lighter materials, including, but not limited to composite materials. However, like titanium and aluminum, fan blades made from composite materials also have the ability to build up static charges. Further, a galvanic potential can develop from the use of multiple materials. Thus, fan blades made from a more than one material, e.g., a metallic body with a composite sheath, are prone to the development of a static charge buildup and therefore galvanic corrosion. Thus, static charge buildup on composite fan blades, metallic fan blades or fan blades made from multiple materials can cause galvanic corrosion.

To address this problem, grounding tabs may be installed that are physically connected to each fan blade, typically with an adhesive. The grounding tabs directly engage a component that is in contact with the rotor or the rotor itself thereby providing an electrical connection between the fan blade and the rotor, which serves to ground the fan blades.

However, as noted above, the grounding tabs are bonded to each fan blade. Not only does the use of grounding tabs add additional components and manufacturing steps to the fan blade assembly, the bonding between the grounding tabs and the fan blades can create gaps between the tabs and the fan blades, thereby making the grounding tabs ineffective as well as permitting moisture to penetrate between the grounding tabs and the fan blades.

Thus, improved methods and designs are needed for providing grounding for fan blades in general and, more specifically, for fan blades of gas turbine engines.

SUMMARY OF THE DISCLOSURE

In one aspect, a fan assembly for a gas turbine engine in disclosed. The disclosed fan assembly may include a rotor coupled to at least one fan blade. The disclosed fan assembly may further include a spinner that may include an extension including an edge. The edge may be electrically conductive and may engage the at least one fan blade for purposes of grounding the fan blade.

In another aspect, a spinner for a fan assembly for a gas turbine engine is disclosed. The spinner may include a body including an edge. The annular body may be fabricated from a composite or a plastic material and the edge may be coated with a conductive material.

In another aspect, a method for grounding fan blades of a fan assembly of a gas turbine engine is disclosed. The disclosed method may include providing a rotor coupled to at least one fan blade and providing a spinner having an annular body. The annular body of the spinner may include an edge and a radially inwardly extending flange. The edge may include a conductive material. The method may further include connecting the flange of the spinner to the rotor so the edge of the spinner engages the at least one fan blade.

In any one or more the embodiments described above, the edge of the spinner may be coated with a conductive material.

In any one or more the embodiments described above, the spinner may be fabricated from a conductive material.

In any one or more the embodiments described above, the spinner may be fabricated from a composite material that includes conductive materials.

In any one or more the embodiments described above, the spinner may be fabricated from one or more plastics or polymers.

In any one or more the embodiments described above, the spinner may be coupled to the rotor.

In any one or more the embodiments described above, the at least one fan blade may include a metallic body that engages the edge of the spinner.

In any one or more the embodiments described above, the at least one fan blade may include a composite body that engages the edge of the spinner.

In any one or more the embodiments described above, the spinner may be coupled to and disposed between the rotor and a spinner cap.

In any one or more the embodiments described above, the spinner may be fabricated from a composite material and the edge of the spinner may be plated with a conducted material.

In any one or more the embodiments described above, the edge of the spinner may be covered with a conductive material.

In any one or more the embodiments is described above, the spinner may include one edge that is coupled to a spinner cap, another edge that engages the fan blades, and a radially inwardly extending flanged disposed between the edges of the spinner. The radially inwardly extending flanged may be coupled to the rotor.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
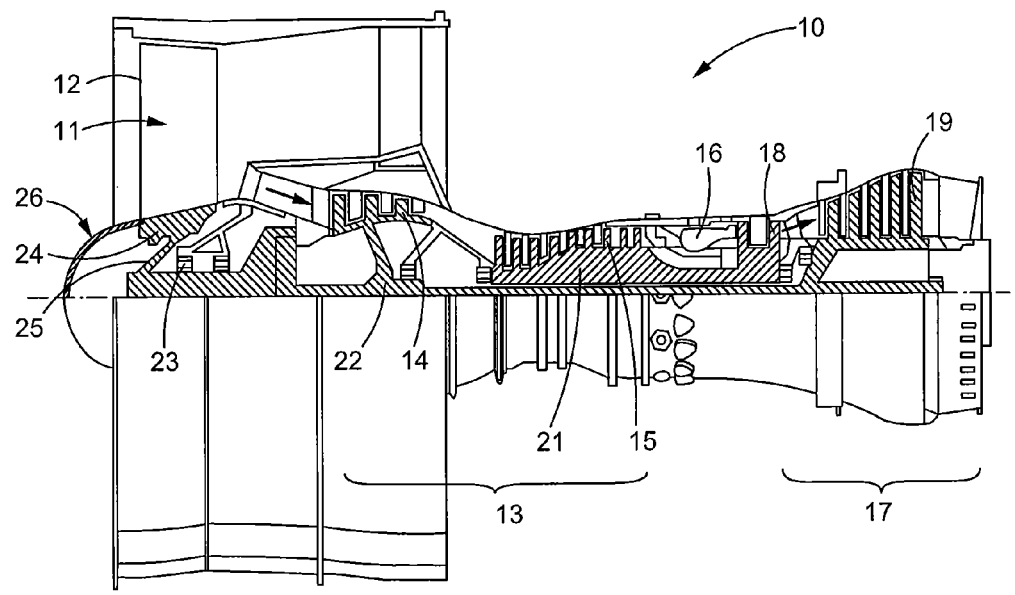
FIG. 1 is a sectional view of an exemplary gas turbine engine.

A gas turbine engine 10 is shown in FIG. 1. As shown, the engine 10 includes a fan assembly 11 (which includes a plurality of fan blades 12), a compressor section 13 (which includes both a low-pressure compressor 14 and a high-pressure compressor 15), a combustor 16, and a turbine section 17 (which includes both a high-pressure turbine 18 and a low-pressure turbine 19). The high-pressure compressor 15 is driven, via a first spool 21, by the high-pressure turbine 18. The low-pressure compressor 14 is driven, via a second spool 22, by the low-pressure turbine 19. Also driven by the low-pressure turbine 19 is the fan assembly 11, which is coupled to the second spool 22 via a gearbox 23. The fan blades 12 are coupled to a rotor 24, which is coupled to the second spool 22 via a shaft extension 25. The rotor 24 is also coupled to a nose assembly 26.

In the embodiment shown in FIG. 1, the fan assembly 11 delivers air to the compressor section 13. Air compressed by the compressor section 13 is delivered to the combustor 16. Products of combustion in the combustor 16 pass downstream to drive the turbine section 17, which in turn drives the compressor section 13.

While a fan assembly 11 disposed fore of the compressor section 13 is shown in FIG. 1, this disclosure also applies to fan assemblies disposed aft of the turbine section 17. Hence, the terms "fore" and "aft" are used herein to describe the orientation shown in FIG. 1, but one skilled in the art will realize such a fan assembly could be mounted aft of the turbine section 17, which may require a reversal of the use of the terms "fore" and "aft."

Figure 2:
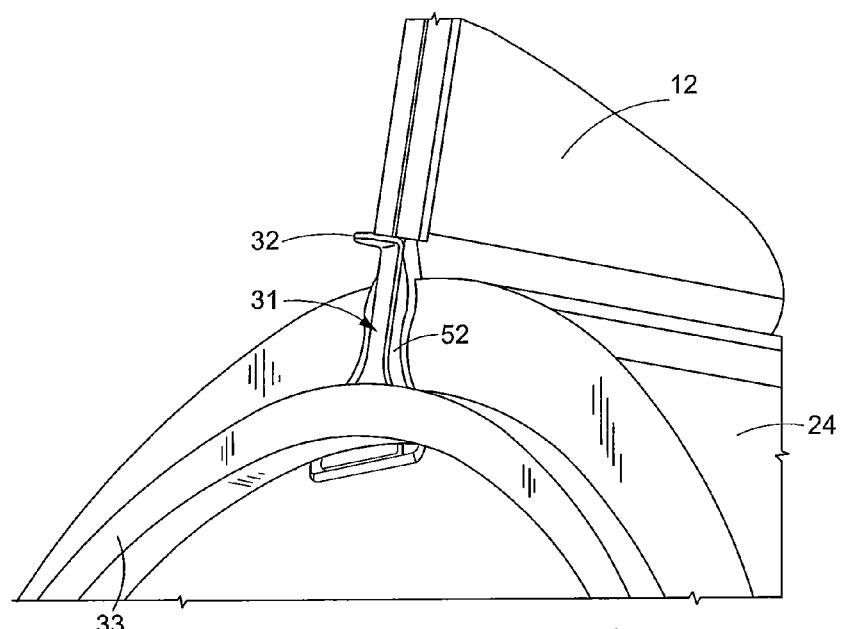
FIG. 2 is a partial view of a fan assembly of a gas turbine engine showing a grounding tab in engagement with a fan blade and a lock ring that is in engagement with the rotor.

Turning to FIG. 2, the use of large fan blades 12 can result in a buildup of a static electric charge across of fan blade 12. To remedy this situation, the fan blades 12 need to be grounded. As shown in FIG. 2, one previous means for grounding the fan blades 12 is to attach a grounding tab 31 to the fan blade 12. In the specific prior art embodiment shown in FIG. 2, the grounding tab 31 includes a lip 32 that is typically connected to the fan blade 12 using an adhesive. The grounding tab 31 also engages a lock ring 33 which, in turn, engages the rotor 24. Hence, the grounding tab 31 provides an electrical connection between the fan blade 12 and the rotor 24, via the lock ring 23.

This solution is problematic for a number of reasons. First, separate grounding tabs 31 are required for each fan blade 12. Second, the grounding tabs 31 may be bonded to the fan blades 12 via an adhesive or other suitable means. During assembly, if the bonding process is not carried out with sufficient precision, gaps can be created between the lips 32 or the grounding tabs 31 and the fan blade 12, which can make the grounding tabs 31 ineffective. Further, such gaps can accumulate moisture, which can lead to corrosion problems.

Figure 3:
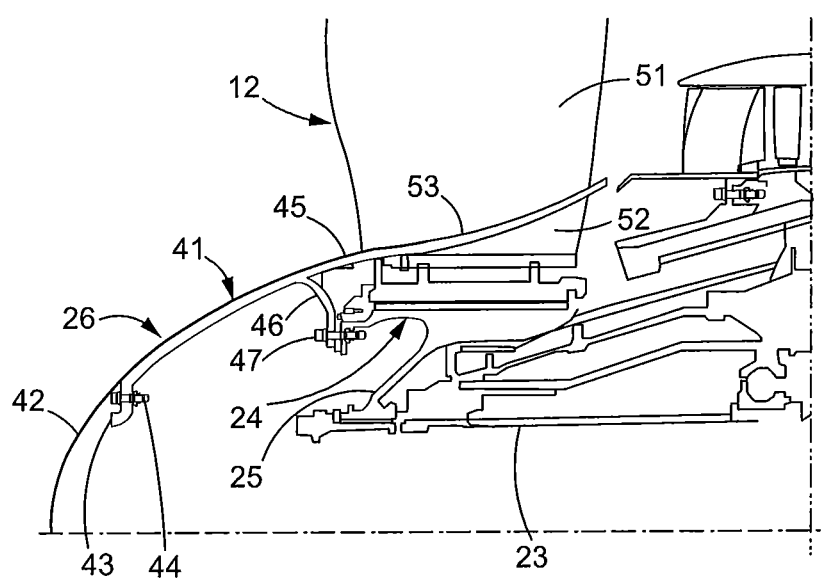
FIG. 3 is a partial sectional view of the gas turbine engine shown in FIG. 1, particularly illustrating the use of a spinner that engages the fan blades for purposes of grounding the fan blades.

An improved solution to the problem of providing a reliable ground for fan blades 12 is illustrated in FIG. 3. First, the grounding tabs 31 as illustrated in FIG. 2 have been eliminated. Like the fan blade 12 shown in FIG. 2, the fan blade 12 of FIG. 3 is also coupled to the rotor 24. The fan blades 12 are disposed immediately aft of a spinner 41 that is part of the nose assembly 26. The nose assembly 26 also includes a spinner cap 42. The spinner 41 includes a fore edge 43 that is coupled to the spinner cap 42 via one or more fasteners 44. The spinner 41 also includes an aft edge 45 that engages the fan blade 12 as shown in FIG. 3. A radially inwardly extending flange 46 is disposed between the fore edge 43 and the aft edge 45. The flange 46 extends radially inwardly as shown FIG. 3 and is coupled to the rotor 24 by one or more fasteners 47.

Thus, the spinner 41 provides a ground for the fan blade 12. The spinner 41 may be fabricated from a metallic material, such as an aluminum or titanium alloy. If the metallic material is used to fabricate the entire spinner 41, the aft edge 45 need not coated with any special conductive materials. However, in an effort to save weight and increase fuel efficiency, gas turbine engine manufactures may use lightweight composite or plastic materials as a replacement for titanium or aluminum alloy components. Hence, the spinner 41 may be fabricated from such a lightweight composite or plastic material. If the material used to fabricate the spinner 41 is not sufficiently conductive, then the aft edge 45 may be coated with a conductive material. The coating may be done in any conventional manner, such as plating. In addition, a ring-shaped grounding component can be mounted to the aft edge 45 of the spinner 41, which will, in turn engage the fan blade 12. Regardless, the aft edge 45 of the spinner 41 extends to the fan blade 12. It may engage a portion of the airfoil 51, a portion of the root 52 or the platform 53 that is disposed between the root 52 and the airfoil 51. The aft edge 45 of the spinner 41 may also be coupled to a seal element.

Thus, individual grounding tabs for each fan blade have been eliminated. Further, an additional part or component for grounding the fan blades is not necessary. Instead, part of the nose assembly, the spinner, is used for purposes of grounding the fan blades. The spinner may be sized or designed so it can engage the fan blades and rotate with the fan blades by the way its connection to the rotor.

The disclosed embodiments may be employed in gas turbine engines of all types, including commercial and military aircraft, with and without thrust augmenters.

While only certain embodiments have been set forth, alternatives and modifications will be apparent from the above description to those skilled in the art. These and other alternatives are considered equivalents and within the spirit and scope of this disclosure and the appended claims.

What is claimed:

1. A fan assembly for a gas turbine engine, the fan assembly comprising:
    a rotor coupled to at least one fan blade;
    a spinner providing an electrical ground for the at least one fan blade;
    the spinner including an edge, the edge being electrically conductive and the edge extends to and engages the at least one fan blade such that the edge provides the electrical ground for the at least one fan blade.

2. The fan assembly of claim 1 wherein the edge of the spinner is coated with a conductive material.

3. The fan assembly of claim 1 wherein the spinner is fabricated from a conductive material.

4. The fan assembly of claim 1 wherein the spinner is fabricated from a composite material that includes conductive material.

5. The fan assembly of claim 1 wherein the spinner is fabricated from at least one plastic.

6. The fan assembly of claim 1 wherein the at least one fan blade includes a metallic body that engages the edge of the spinner.

7. The fan assembly of claim 1 wherein the at least one fan blade includes a composite body that engages the edge of the spinner.

8. The fan assembly of claim 1 wherein the spinner is coupled to and disposed between the rotor and a spinner cap.

9. The fan assembly of claim 1 wherein the spinner is fabricated from a composite or a plastic material and the edge of the spinner is plated with a conductive material.

10. The fan assembly of claim 1 wherein the edge of the spinner is covered with a conductive material.

11. The fan assembly of claim 8 wherein the spinner includes another edge that is coupled to the spinner cap and a radially inwardly extending flange, the radially inwardly extending flange being coupled to the rotor.

12. A method for grounding fan blades of a fan assembly of a gas turbine engine, the method comprising:
    providing a rotor coupled to at least one fan blade;
    providing a spinner having an annular body including an edge and a radially inwardly extending flange, the edge including conductive material;
    connecting the flange of the spinner to the rotor so the edge engages the at least one fan blade; and
    electrically grounding the at least one fan blade to the rotor via the edge.

13. The method of claim 12 wherein the edge of the spinner is coated with the conductive material.

14. The method of claim 12 wherein the spinner is fabricated from a conductive material.

15. The method claim 12 wherein the spinner is fabricated from a composite material that includes conductive material.

16. The method of claim 12 wherein the at least one fan blade includes a metallic body.

17. The method of claim 12 wherein the at least one fan blade includes a composite body.

18. The method of claim 12 further including plating the edge of the spinner with a conductive material.

19. The method of claim 12 further including covering the edge of the spinner with a conductive material.

* * * * *